(12) United States Patent
Emerson et al.

(10) Patent No.: US 11,078,386 B2
(45) Date of Patent: *Aug. 3, 2021

(54) ADDITIVE FOR QUALITY DETERMINATION OF ADHESIVE BOND PRIMERS

(71) Applicant: Hamilton Sundstrand Corporation, Charlotte, NC (US)

(72) Inventors: Sean C. Emerson, Broad Brook, CT (US); Blair A. Smith, South Windsor, CT (US); Weina Li, South Glastonbury, CT (US); Georgios S. Zafiris, Glastonbury, CT (US); Bart Antoine Van Hassel, Weatogue, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/153,539

(22) Filed: Oct. 5, 2018

(65) Prior Publication Data

US 2020/0109317 A1    Apr. 9, 2020

(51) Int. Cl.
*C09J 9/00* (2006.01)
*C09J 7/30* (2018.01)
(Continued)

(52) U.S. Cl.
CPC .................. *C09J 9/00* (2013.01); *B32B 7/12* (2013.01); *B32B 37/12* (2013.01); *B32B 38/00* (2013.01); *C09B 5/026* (2013.01); *C09B 5/12* (2013.01); *C09B 6/00* (2013.01); *C09B 57/002* (2013.01); *C09B 57/02* (2013.01); *C09B 57/08* (2013.01); *C09B 57/14* (2013.01); *C09J 7/30* (2018.01); *C09J 11/04* (2013.01); *C09J 11/06* (2013.01);
(Continued)

(58) Field of Classification Search
None
See application file for complete search history.

(56) References Cited

U.S. PATENT DOCUMENTS 5,266,611 A    11/1993  Teschendorf
6,494,543 B1 *  12/2002  Hashimura ........... B60B 21/102
                                                 152/510
(Continued)

FOREIGN PATENT DOCUMENTS

JP    2003183576 A        7/2003
JP    2014129435 A  *     7/2014
(Continued)

OTHER PUBLICATIONS

Machine translation of JP 2014-129435 A (Year: 2014).*
Extended European Search Report for EP Application No. 19201147.6, dated Feb. 27, 2020, pp. 8.

*Primary Examiner* — Ramsey Zacharia
(74) *Attorney, Agent, or Firm* — Kinney & Lange, P.A.

(57) ABSTRACT

A method of adhering a first component to a second component includes priming the first component with an adhesive bond primer containing a primer material, a corrosion inhibitor, and a chemical additive (such as a dye compound), and using an adhesive to attach the second component to the first component through the adhesive bond primer applied on the surface of the second component. The chemical additive allows inspection of the adhesive bond primer with a corresponding radiation source.

17 Claims, 2 Drawing Sheets

(51) Int. Cl.

| | | |
|---|---|---|
| *B32B 7/12* | (2006.01) | |
| *B32B 37/12* | (2006.01) | |
| *B32B 38/00* | (2006.01) | |
| *C09B 5/02* | (2006.01) | |
| *C09B 5/12* | (2006.01) | |
| *C09B 6/00* | (2006.01) | |
| *C09B 57/02* | (2006.01) | |
| *C09B 57/08* | (2006.01) | |
| *C09B 57/14* | (2006.01) | |
| *C09J 11/04* | (2006.01) | |
| *C09J 11/06* | (2006.01) | |
| *C09K 11/06* | (2006.01) | |
| *C09K 11/08* | (2006.01) | |
| *C09B 57/00* | (2006.01) | |

(52) U.S. Cl.
CPC .............. *C09K 11/06* (2013.01); *C09K 11/08* (2013.01); *B32B 2307/422* (2013.01); *B32B 2307/714* (2013.01); *C09J 2301/408* (2020.08)

(56) References Cited

U.S. PATENT DOCUMENTS

| | | |
|---|---|---|
| 8,410,992 B2 | 4/2013 | Bailey et al. |
| 8,720,278 B1 | 5/2014 | Toivola et al. |
| 2007/0187028 A1 | 8/2007 | Braun et al. |
| 2012/0094130 A1* | 4/2012 | Foscante ................ C09D 5/084 428/418 |
| 2012/0121929 A1* | 5/2012 | Smith .................... C23C 22/66 428/639 |
| 2012/0237740 A1* | 9/2012 | Hefty .................... B82Y 30/00 428/196 |
| 2012/0282404 A1* | 11/2012 | Rosenkranz ........... C23C 22/78 427/337 |
| 2016/0083848 A1 | 3/2016 | Chernyshov |

FOREIGN PATENT DOCUMENTS

| | | |
|---|---|---|
| KR | 20150061404 A | 6/2015 |
| WO | WO2017116547 A1 | 7/2017 |

* cited by examiner

ADDITIVE FOR QUALITY DETERMINATION OF ADHESIVE BOND PRIMERS

BACKGROUND

This application relates generally to adhesives and specifically to adhesive bond primers.

Aircraft components require joining through adhesives, such as pressure sensitive adhesives or chemical adhesives. In many cases, adhesive bond primers are used on component metallic surfaces to promote adhesion and strong bonds between adhered components, as well as provide corrosion inhibition and protection to the aforementioned metallic substrates. Typically, when adhesive bond primers are applied to component surfaces, they are colorless, meaning that are typically not visible when exposed to electromagnetic radiation in any useful wavelength, including electromagnetic radiation within the human visible spectrum (about 390 nanometers to about 700 nanometers).

This is particularly true with non-chromated adhesive bond primers, which are becoming more common as hexavalent chromium is being phased out of the industry replaced by non-chromated or chrome-free alternative chemistries. Adhesive bond primers are applied at dry film thicknesses between 0.0001 and 0.0004 inches, which along with the lack of color make it difficult to determine the uniformity of such an adhesive bond primer coating. Traditional dyes, pigments and colorants which could be used to provide color are either not compatible with adhesive bond primer chemistry or affect its adhesive and/or corrosion inhibition performance.

SUMMARY

In a first embodiment, an assembly includes a first component, a first adhesive bond primer thereon, a second component, a second adhesive bond primer thereon, and an adhesive adhering the first component to the second component through the first adhesive bond primer and the second adhesive bond primer. The first adhesive bond primer includes a first primer material and a first chemical additive, wherein the chemical additive interacts with electromagnetic radiation outside the human visual spectrum to produce an observable emission. The second adhesive bond primer includes a second primer material and a second chemical additive, wherein the chemical additive interacts with electromagnetic radiation outside the human visual spectrum to produce an observable emission.

In a second embodiment, adhesive bond primer includes an adhesive primer, a corrosion inhibitor, and a dye compound that interacts with electromagnetic radiation outside the human visual spectrum but not electromagnetic radiation that is within the human visual spectrum to produce an observable emission.

In a third embodiment, a method of inspecting an adhesive bond of a first component to a second component includes applying electromagnetic radiation to an adhesive bond primer comprising a primer material, a corrosion inhibitive pigment(s), and a chemical additive that interacts with electromagnetic radiation outside the human visual spectrum but not electromagnetic radiation that is within the human visual spectrum to produce an observable emission, and inspecting the integrity of the adhesive bond primer by observing emissions from the chemical additive in response to the electromagnetic radiation.

DETAILED DESCRIPTION

Primers are generally used to prepare a surface for application of another coating layer or a material. Adhesive bond primers prepare components surfaces for the addition of an adhesive, to create a bond between a first component and a second component. When used to bond metallic components surfaces, adhesive bond primers typically contain a corrosion inhibitor that protects the metallic surfaces from corrosion. Such an adhesive bond primer allows for more uniform adhesion across the surfaces of the bonded components and longer lifespan for the bonded structure, as well as protection of the substrate surfaces against corrosion.

Prior Art corrosion inhibitors contain chromated (hexavalent chromium) compounds, which were visibly tinted (often yellow). Due to environmental and health regulations these chromated compounds are being replaced by non-chromated and chrome-free alternative chemistries which pose fewer health and environmental concerns. However, non-chromated or chrome-free adhesive bond primers are colorless. Thus, after application of a chromate-free or chrome-free adhesive bond primer to a component, inspection of that adhesive bond primer is difficult. The disclosed adhesive bond primer with a dye compound or chemical additive allows for visual inspection of applied bond primers after application.

Figure 1:
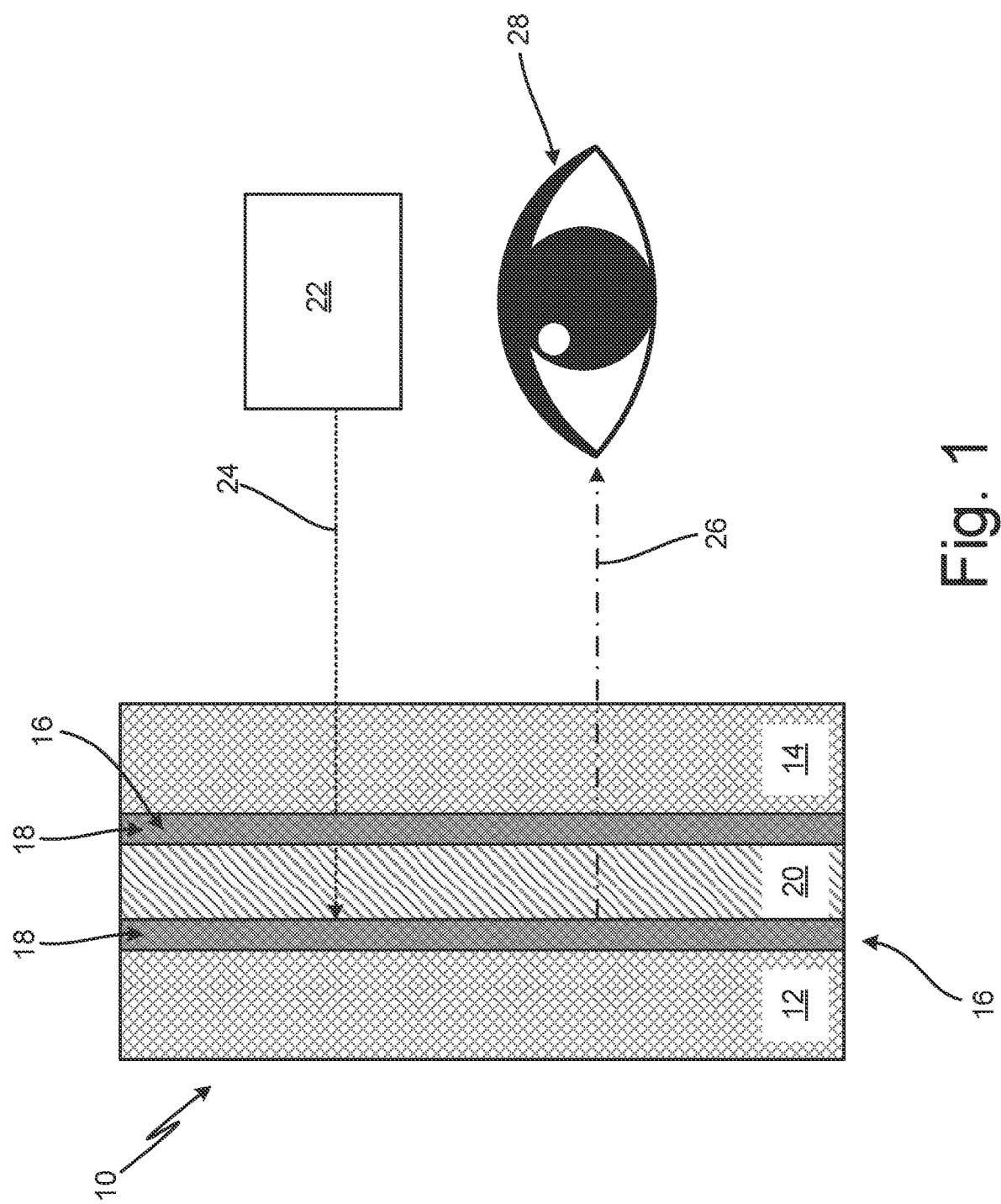
FIG. 1 is a schematic drawing of an aircraft component assembly containing adhesive bond primer with dye compound.

FIG. 1 is a schematic drawing of component assembly 10 containing adhesive bond primer with dye compound 18. Assembly 10 includes first component 12, second component 14, adhesive bond primer 16 (containing dye compound 18), adhesive 20, radiation source 22, radiation 24, emission 26, and emission detector 28.

First component 12 and second component 14 are components that must be adhered to each other. Components 12, 14 can be, for example, aircraft components such as pieces of floor or side panels, rotor blades, vanes, propellers, landing gear, nacelles, electronic boxes, fasteners, nuts, bolts, washers, rivets, or other components. Components 12, 14 also can be any components from any other application that can benefit from use of the disclosed adhesive bond primer. These components can be made of metal, such as steel, corrosion resistant steel, aluminum, titanium, metal-plated (e.g. Ni, Zn—Ni, Cr, etc.) steel or aluminum alloys, or other metal substrates; polymer matrix composites with organic and/or inorganic fibers, ceramic matrix composites, plastic and polymeric materials, or any other material that a person skilled in the art would deem to be compatible with the disclosed adhesive bond primer.

Adhesive 20 is a structural adhesive for adhering component 12 to component 14. Depending on the materials of components 12 and 14, adhesive 20 can be a pressure sensitive adhesive or a chemical adhesive such as an epoxy. Adhesive 20 is designed to securely attach component 12 to component 14, but the surface of component 12 must be primed prior to application of adhesive 20. Typical commercially available adhesives include 3M®'s EC family of structural adhesives (e.g. EC-3984, EC-3964, EC-1458, etc.) and AF structural adhesive films (e.g. AF 130-2, AF 143-2, etc.)

Adhesive bond primer 16 is an adhesive bond primer used to increase adhesion of adhesive 20 to components 12, 14. In other embodiments, adhesive bond primer 16 acts as a standalone adhesive. The specific type of adhesive bond primer 16 used depends on the performance requirements of adhesive 20, components 12, 14, and other external factors. Adhesive bond primer 16 is thin, having a dry film thickness between 0.0001 inches and 0.0004 inches. Adhesive bond primer 16 upon Wedge Crack Extension Testing (WCET) in accordance with ASTM D3762 has a wedge crack growth of no more than 0.25 inches, and upon lap shear testing in accordance with ASTM D1002 a minimum value of stress at failure of at least 440 psi. Typically, adhesive bond primer 16 can be cured between 250 and 350 degrees Fahrenheit using techniques well known in the art. Examples of non-chromate or chrome-free adhesive bond primer 16 include EW-5000 ET, EW-5005, EW-5000AS by 3M, BR127NC, BR252, and BR6747-1NC by Solvay®, Henkel® 9258 and Henkel® 9296.

Generally, adhesive bond primer 16 includes a primer material whose chemistry aids in adhesion of adhesive 20 to component 12 in addition to dye compound 18. In the case of adhesive bond primers specifically designed for metal substrates, a corrosion inhibitor pigment is also included. Corrosion inhibitor formulations typically include a corrosion inhibitive cation, comprising at least one of zinc, calcium, strontium, magnesium, aluminum, chromium, manganese, or rare earth such as cerium, praseodymium, neodymium; a corrosion inhibitive anion, comprising at least one of phosphate, molybdate, vanadate, silicate, tungstate, orthophosphate; and in some cases a complexing agent, comprising at least one of citric acid, nitrilotracetic acid (NTA), oxalic acid, formic acid, acetic acid, tartaric acid, nicotinic acid, ethylene diamine tetraacetic acid (EDTA), malonic acid, cerium citrate, cerium(III) citrate, and combinations thereof. For example, adhesive bond primer 16 can be an epoxy-based primer with dye compound 18 particles mixed in. The size of particles in adhesive bond primer 16 can be less than 1 micrometers, or between 1 micrometers and 10 micrometers.

Dye compound 18 is a dye mixed in with adhesive bond primer 16. Dye compound 18 allows for visual inspection of adhesive bond primer 16 following irradiation with electromagnetic radiation 24 of an appropriate wavelength. Dye compound 18 interacts with electromagnetic radiation outside the human visual spectrum, such as ultra violet light or infrared light, but is otherwise compatible with adhesive bond primer 16; meaning dye compound 18 does not alter the chemical composition nor inherent properties of adhesive bond primer 16, adhesive 20, or component 12. In some embodiments, dye compound 18 reflects or scatters the non-absorbed electromagnetic radiation 24. In other embodiments, dye compound 18 phosphoresces or fluoresces when it is exposed to electromagnetic radiation 24. In other embodiments, dye compound 18 is a different type of chemical additive that interacts with electromagnetic radiation.

Dye compound 18 can be, for example, a strontium rare earth metal, an organic compound, or other fluorescent or phosphorescent materials that interacts with electromagnetic radiation. Fluorescent materials emit backlight, typically in the human visible spectrum, upon their exposure to and absorbance of electromagnetic radiation, such as UV light in the range of 300 to 350 nanometers. The exact color fluorescent materials emit depends on their molecular structure. These materials can be either inorganic or organic molecules.

Appropriate organic fluorescent materials include polycyclic or polyaromatic hydrocarbons containing heteroatom such as sulfur, nitrogen, and oxygen. For example, appropriate materials that fluoresce in red include anthra-thioxanthene, thioxanthene benzanthrone, and anthraquinones. Materials that fluoresce in yellow includes xanthene, benzothioxanthene-dicarboximide, aminoketones, naphtalimide, and perylene. Materials that fluoresce in blue include coumarin and hydroxycoumarin. Appropriate inorganic fluorescent materials include some divalent manganese containing salts such as manganese doped zinc silicate, which fluoresces green or trivalent lathanide salts.

Phosphorescent materials emit backlight upon being exposed to electromagnetic radiation of a shorter wavelength. Compared to fluorescent materials, phosphorescent materials light emission is of lower intensity and lasts longer, for some time beyond the original excitation. Appropriate phosphorescent materials include strontium aluminates, lanthanide doped (e.g., europium, dysprosium, cerium doped) or manganese doped strontium aluminates, and copper activated zinc sulfide.

Alternatively, dye compound 18 can be a mixture of any of the dyes or chemical additives discussed above. Such types of dye mixtures can additionally include additives such as quantum dots or yttrium aluminum garnet (YAG) type photoluminescent materials. The exact ratio, type, and mixture of dyes or chemical additives can act as a "signature" for a particular manufacturer. A specific mixture of dye compounds can be used as a security feature to prevent use of counterfeit parts that do not contain such a dye mixture.

Generally, dye compound 18 should be no more than 15% by weight of adhesive bond primer 16, such as no more than 5% by weight of adhesive bond primer 16, and may be no more than 1% by weight of adhesive bond primer 16. Thus, dye compound 18 should not interfere with the chemistry of adhesive bond primer 16 or adhesive 20, but should still be observable when excited by the correct wavelength of light for inspection.

Radiation source 22 is used to inspect the integrity of adhesive bond primer 16. Radiation source 22 should be selected such that it produces radiation 24 that interacts with dye compound 18 to produce observable emission 26. For example, if dye compound 18 absorbs wavelengths in the ultra violet range, then radiation source 22 can be a UV lamp. In other embodiments, radiation source 22 can be a black light, IR lamp, or laser, depending on dye compound 18. Radiation source 22 induces phosphoresce, or fluorescence, reflection, or scattering of non-absorbed radiation in dye compound 18 to allow visual inspection.

In one embodiment, dye 18 emits in the visible the spectrum upon exposure to ultra-violet or "black light", or higher frequency electromagnetic radiation, thus enabling the visual inspection of the integrity of the applied adhesive bond primer film. In another embodiment, dye 18 absorbs in the visible spectrum upon exposure to UV or "black light" or higher frequency radiation, thus allowing for the adhesive bond primer coated film flaws and uncoated metal areas to be observable and distinguishable against the dark coated background. In a yet another embodiment, dye 18 emits in a non-visible range of the spectrum upon exposure to a higher frequency electromagnetic radiation, via either a fluorescence or a phosphorescence mechanism. In this case, an appropriate instrumentation that allows for the visualization of the emitted radiation is utilized to inspect the integrity of the applied adhesive bond primer film.

Emission detector 28 can be, for example, a human eye where emissions 26 are within the visible spectrum. Alternatively, if emissions 26 are outside of the visible spectrum, other types of detectors such as UV or IR detector devices can be used for detector 28. Emissions within the visible spectrum are preferred for simplicity. These alternative types of detectors (i.e. UV or IR detectors) can be used in conjunction with an automated inspection system and paired with a computer to record the inspection of adhesive bond primer 16. When adhesive bond primer 16 is inspected with radiation source 22, the inspector looks for skipping, lines, uniformity, pin-holes, and defects or damage to adhesive bond primer coated film 16. The inspector can also look for holes or wear in adhesive bond primer 16. Ideally, dye compound 18 has a long lifespan and allows for inspection of parts with radiation source 22 after manufacturing and after use of the parts in service. For example, parts in service that experience friction, high or low temperatures, sunlight, or other environmental conditions, can be inspected to ensure adhesive bond primer 16 is still intact.

Figure 2:
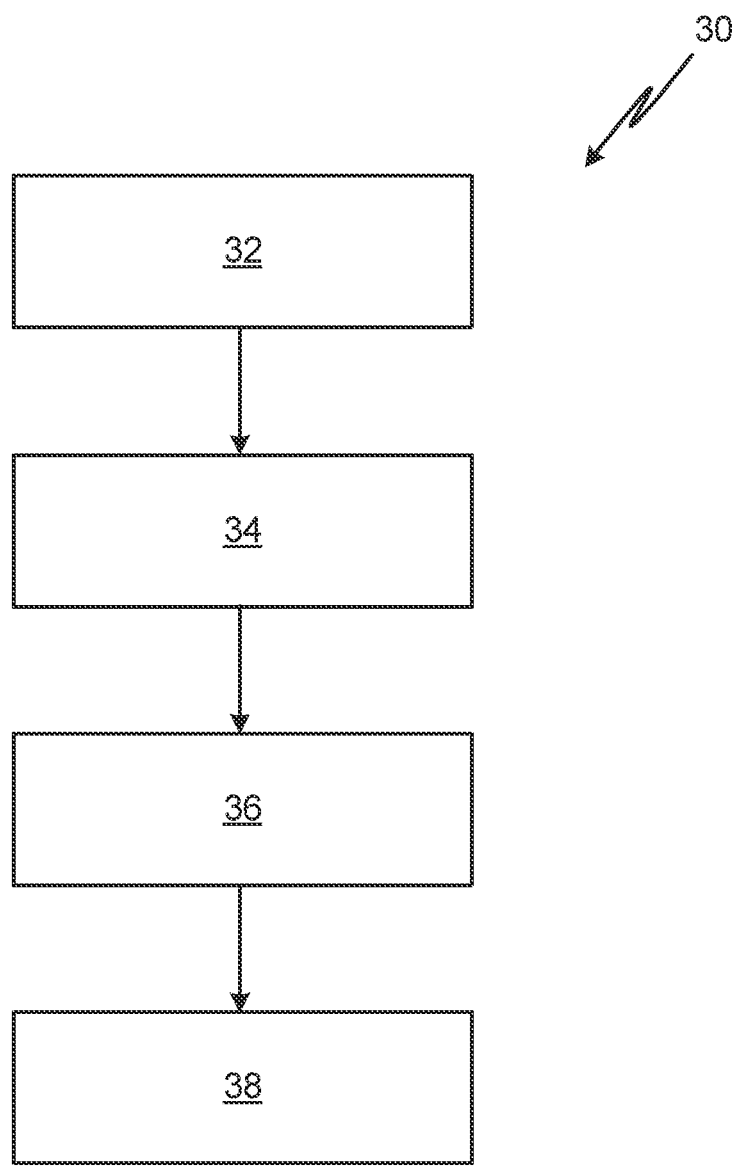
FIG. 2 is a flow chart of a method of making an aircraft component assembly containing adhesive bond primer with dye compound.

FIG. 2 is a flow chart of method 30 of making an aircraft component assembly containing adhesive bond primer with dye compound with steps 32-38.

First, in step 32, the adhesive bond primer is prepared. An adhesive bond primer is chosen that will work to prepare the surface of the aircraft component needing to be adhered to a second component. The primer can be a commercially available adhesive bond primer such as those discuss with reference to FIG. 1. The adhesive bond primer also includes a dye compound as described with reference to FIG. 1. The dye compound can be mixed into the adhesive bond primer through normal methods such as dispersion or mechanical mixing, or any other method that a person skilled in the art would deem to be appropriate. The adhesive bond primer may contain other chemicals such as surfactants or additives for the integrity of the adhesive bond primer. Mixing methods should avoid phase separation of the adhesive bond primer.

Next, in step 34, the adhesive bond primer is applied to the component surface. Adhesive bond primer can be applied through methods such as application with a brush, roller, spray, wipe or immersion applications or any other method that a person skilled in the art would deem to be appropriate. In some embodiments, the component may need to be prepared through cleaning or mechanical roughening (e.g., abrasive blasting, sanding, filing, etc.,) other surface modifications to encourage adhesion of the adhesive bond prime coating using methods that a person skilled in the art would deem to be appropriate.

Alternatively, the adhesive bond primer can be applied to the component first, and the dye compound or chemical additive can be added during or after application of the adhesive bond primer to the component.

Next, in step 36, the adhesive is applied to the adhesive bond primer. The adhesive works with the properties of the adhesive bond primer to create a stronger connection between the component and the adhesive. A second component is then applied to the assembly, adhered to the first component through the adhesive and adhesive bond primer.

Once application of the adhesive bond primer between the component surfaces is complete, the adhesive bond primer is inspected with a radiation source in step 38. The radiation source should correlate to the dye compound used in the adhesive bond primer. For instance, if a dye compound that absorbs UV wavelengths of light is used, then the radiation source should be a UV lamp. In other embodiments, other sources of radiation of appropriate frequency, either higher or lower frequency than UV, including an electron beam can be used.

Application of the radiation source to the adhesive bond primer allows dye compound to become observable, and allows for inspection of the adhesive bond primer. The adhesive bond primer can be inspected for coating uniformity and thickness, and weak or missed spots and flaws can be observed. If there are serious problems with the adhesive bond primer, it can be stripped and re-applied. This inspection can occur before application of the adhesive and second component to the assembly, allowing inspecting of the adhesive bond primer on the first component only. Similarly, a different adhesive bond primer coating applied to the second component can be inspected using the same approach prior to joining.

The use of a dye compound or chemical additive in an adhesive bond primer allows for detection of the presence and uniformity of the surface treatment where the adhesive bond primer is typically non-visible within the human visible spectrum. This allows for quality control in manufacturing and later repair of adhesive bond primer with defects. For example, defects and voids in the coated adhesive bond primer film can be visualized and observed with naked eye upon excitation with appropriate UV or "black light" lamp light. Moreover, the inspection of such an adhesive bond primer with the aforementioned radiation source does not require difficult to obtain equipment and can be an efficient, portable method of inspecting adhesive bond primers.

DISCUSSION OF POSSIBLE EMBODIMENTS

The following are non-exclusive descriptions of possible embodiments of the present invention.

An assembly includes a first component, a first adhesive bond primer thereon, a second component, a second adhesive bond primer thereon, and an adhesive adhering the first component to the second component through the first adhesive bond primer and the second adhesive bond primer. The first adhesive bond primer includes a first primer material and a first chemical additive, wherein the chemical additive interacts with electromagnetic radiation outside the human visual spectrum to produce an observable emission. The second adhesive bond primer includes a second primer material and a second chemical additive, wherein the chemical additive interacts with electromagnetic radiation outside the human visual spectrum to produce an observable emission.

The assembly of the preceding paragraph can optionally include, additionally and/or alternatively, any one or more of the following features, configurations and/or additional components:

The first and second components are selected from the group consisting of rotor blades, vanes, wings, heating panels, acoustic panels, floor or side panels, propellers, landing gear, nacelles, electronic boxes, fasteners, nuts, bolts, washers, and rivets.

The first and second chemical additives contain molecules that are observable in the visible, infrared or ultra violet range of the electromagnetic spectrum when excited.

The first and second chemical additives are fluorescent or phosphorescent when exposed to electromagnetic radiation.

The chemical additives emit in the visible spectrum when exposed to ultra violet light.

An adhesive bond primer includes an adhesive primer, a corrosion inhibitor, and a dye compound that interacts with electromagnetic radiation outside the human visual spectrum but not electromagnetic radiation that is within the human visual spectrum to produce an observable emission.

The primer of the preceding paragraph can optionally include, additionally and/or alternatively, any one or more of the following features, configurations and/or additional components:

The adhesive bond primer has a thickness between 0.0001 inches and 0.0004 inches.

The dye compound comprises fluorescent molecules selected from the group consisting of polycyclic hydrocarbons, polyaromatic hydrocarbons, and combinations thereof.

The polycyclic or polyaromatic hydrocarbons are selected from the group consisting of anthra-thioxanthene, thioxanthene benzanthrone, anthraquinones, xanthene, benzothioxanthene-dicarboximide, aminoketones, coumarin, hydroxycoumarin, naphthalimide and perylene.

The dye compound comprises phosphorescent molecules selected from the group consisting of strontium aluminates, lanthanide doped strontium aluminates, manganese doped strontium aluminates, and copper activate zinc sulfide.

The corrosion inhibitor includes a corrosion inhibitive cation selected from the group consisting of zinc, calcium, strontium, magnesium, aluminum, chromium, manganese, rare earth metals, and combinations thereof and a corrosion inhibitive anion selected from the group consisting of phosphate, molybdate, vanadate, silicate, tungstate, orthophosphate, and combinations thereof.

The dye compound comprises less than 15% by weight of the adhesive bond primer.

The dye compound comprises less than 10% by weight of the adhesive bond primer.

The dye compound comprises less than 5% by weight of the adhesive bond primer.

A method of inspecting an adhesive bond of a first component to a second component includes applying electromagnetic radiation to an adhesive bond primer comprising a primer material, a corrosion inhibitive pigment(s), and a chemical additive that interacts with electromagnetic radiation outside the human visual spectrum but not electromagnetic radiation that is within the human visual spectrum to produce an observable emission, and inspecting the integrity of the adhesive bond primer by observing emissions from the chemical additive in response to the electromagnetic radiation.

The method of the preceding paragraph can optionally include, additionally and/or alternatively, any one or more of the following features, configurations and/or additional components:

The method includes curing the adhesive bond primer on the first component.

The method includes curing the adhesive bond primer between 250 and 350 degrees Fahrenheit.

Inspecting the integrity of the adhesive bond primer comprises inducing phosphoresce in the chemical additive.

Inspecting the integrity of the adhesive bond primer comprises inducing fluorescence in the chemical additive.

Inspecting the integrity of the adhesive bond primer comprises inducing reflection or scattering of the non-absorbed radiation in the dye compound or chemical additive.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a first component;
   a first adhesive bond primer thereon comprising:
      a first primer material;
      a corrosion inhibitor, wherein the corrosion inhibitor comprises:
         a corrosion inhibitive cation selected from the group consisting of zinc, calcium, strontium, magnesium, aluminum, chromium, manganese, rare earth metals, and combinations thereof; and
         a corrosion inhibitive anion selected from the group consisting of phosphate, molybdate, vanadate, silicate, tungstate, orthophosphate, and combinations thereof; and
      a first chemical additive, wherein the first chemical additive interacts with electromagnetic radiation outside the human visual spectrum to produce an observable emission, wherein the first chemical additive comprises phosphorescent molecules selected from the group consisting of strontium aluminates, lanthanide doped strontium aluminates, manganese doped strontium aluminates, and copper activate zinc sulfide and the dye compound comprises particles up to 10 μm;
      wherein the first adhesive bond primer can be cured between 250° F. and 350° F., and has a wedge crack growth of no more than 0.25 inches as measured by ASTM D3762 (wedge crack extension testing) and a minimum stress at failure of least 440 psi as measured by ASTM D1002 (lap shear testing); and
   a second component;
   a second adhesive bond primer thereon comprising:
      a second primer material;
      a corrosion inhibitor, wherein the corrosion inhibitor comprises:
         a corrosion inhibitive cation selected from the group consisting of zinc, calcium, strontium, magnesium, aluminum, chromium, manganese, rare earth metals, and combinations thereof; and
         a corrosion inhibitive anion selected from the group consisting of phosphate, molybdate, vanadate, silicate, tungstate, orthophosphate, and combinations thereof; and
      a second chemical additive, wherein the second chemical additive interacts with electromagnetic radiation outside the human visual spectrum to produce an observable emission, wherein the second chemical additive comprises phosphorescent molecules selected from the group consisting of strontium aluminates, lanthanide doped strontium aluminates, manganese doped strontium aluminates, and copper activate zinc sulfide and the dye compound comprises particles up to 10 μm;
      wherein the second adhesive bond primer can be cured between 250° F. and 350° F., and has a wedge crack growth of no more than 0.25 inches as measured by ASTM D3762 (wedge crack extension testing) and a minimum stress at failure of least 440 psi as measured by ASTM D1002 (lap shear testing); and
an adhesive adhering the first component to the second component through the first adhesive bond primer and the second adhesive bond primer.

2. The assembly of claim 1, wherein the first and second components are selected from the group consisting of rotor blades, vanes, wings, heating panels, acoustic panels, floor or side panels, propellers, landing gear, nacelles, electronic boxes, fasteners, nuts, bolts, washers, and rivets.

3. The assembly of claim 1, wherein the chemical additives emit in the visible spectrum when exposed to ultra violet light.

4. An adhesive bond primer comprising:
an adhesive primer;
a corrosion inhibitor, wherein the corrosion inhibitor comprises:
  a corrosion inhibitive cation selected from the group consisting of zinc, calcium, strontium, magnesium, aluminum, chromium, manganese, rare earth metals, and combinations thereof; and
  a corrosion inhibitive anion selected from the group consisting of phosphate, molybdate, vanadate, silicate, tungstate, orthophosphate, and combinations thereof; and
a dye compound that interacts with electromagnetic radiation outside the human visual spectrum but not electromagnetic radiation that is within the human visual spectrum to produce an observable emission, wherein the dye compound comprises phosphorescent molecules selected from the group consisting of strontium aluminates, lanthanide doped strontium aluminates, manganese doped strontium aluminates, and copper activate zinc sulfide and the dye compound comprises particles up to 10 µm;
wherein the adhesive bond primer can be cured between 250° F. and 350° F., and has a wedge crack growth of no more than 0.25 inches as measured by ASTM D3762 (wedge crack extension testing) and a minimum stress at failure of least 440 psi as measured by ASTM D1002 (lap shear testing).

5. The primer of claim 4, wherein the adhesive bond primer has a thickness between 0.0001 inches and 0.0004 inches.

6. The primer of claim 4, wherein the dye compound further comprises fluorescent molecules selected from the group consisting of polycyclic hydrocarbons, polyaromatic hydrocarbons, and combinations thereof.

7. The primer of claim 6, wherein the polycyclic or polyaromatic hydrocarbons are selected from the group consisting of anthra-thioxanthene, thioxanthene benzanthrone, anthraquinones, xanthene, benzothioxanthene-dicarboximide, aminoketones, coumarin, hydroxycoumarin, naphthalimide and perylene.

8. The primer of claim 4, wherein the dye compound comprises less than 15% by weight of the adhesive bond primer.

9. The primer of claim 8, wherein the dye compound comprises less than 10% by weight of the adhesive bond primer.

10. The primer of claim 9, wherein the dye compound comprises less than 5% by weight of the adhesive bond primer.

11. The primer of claim 4, wherein the dye compound further comprises a photoluminescent material.

12. The primer of claim 11, wherein the photoluminescent material is quantum dots, yttrium aluminum garnet, or a mixture thereof.

13. A method of inspecting an adhesive bond of a first component to a second component comprising:
applying electromagnetic radiation to an adhesive bond primer comprising a primer material, a corrosion inhibitive pigment(s), and a chemical additive that interacts with electromagnetic radiation outside the human visual spectrum but not electromagnetic radiation that is within the human visual spectrum to produce an observable emission,
wherein the corrosion inhibitive pigment(s) includes a corrosion inhibitor that comprises:
  a corrosion inhibitive cation selected from the group consisting of zinc, calcium, strontium, magnesium, aluminum, chromium, manganese, rare earth metals, and combinations thereof; and
  a corrosion inhibitive anion selected from the group consisting of phosphate, molybdate, vanadate, silicate, tungstate, orthophosphate, and combinations thereof; and
  a first chemical additive comprises phosphorescent molecules selected from the group consisting of strontium aluminates, lanthanide doped strontium aluminates, manganese doped strontium aluminates, and copper activate zinc sulfide and the dye compound comprises particles up to 10 µm;
wherein the adhesive bond primer can be cured between 250° F. and 350° F., and has a wedge crack growth of no more than 0.25 inches as measured by ASTM D3762 (wedge crack extension testing) and a minimum stress at failure of least 440 psi as measured by ASTM D1002 (lap shear testing); and
inspecting the integrity of the adhesive bond primer by observing emissions from the chemical additive in response to the electromagnetic radiation.

14. The method of claim 13, further comprising curing the adhesive bond primer on the first component.

15. The method of claim 14, further comprising curing the adhesive bond primer between 250 and 350 degrees Fahrenheit.

16. The method of claim 13, wherein inspecting the integrity of the adhesive bond primer further comprises inducing fluorescence in the chemical additive.

17. The method of claim 13, wherein inspecting the integrity of the adhesive bond primer comprises inducing reflection or scattering of the non-absorbed radiation in the dye compound or chemical additive.

* * * * *